United States Patent Office 3,011,014
Patented Nov. 28, 1961

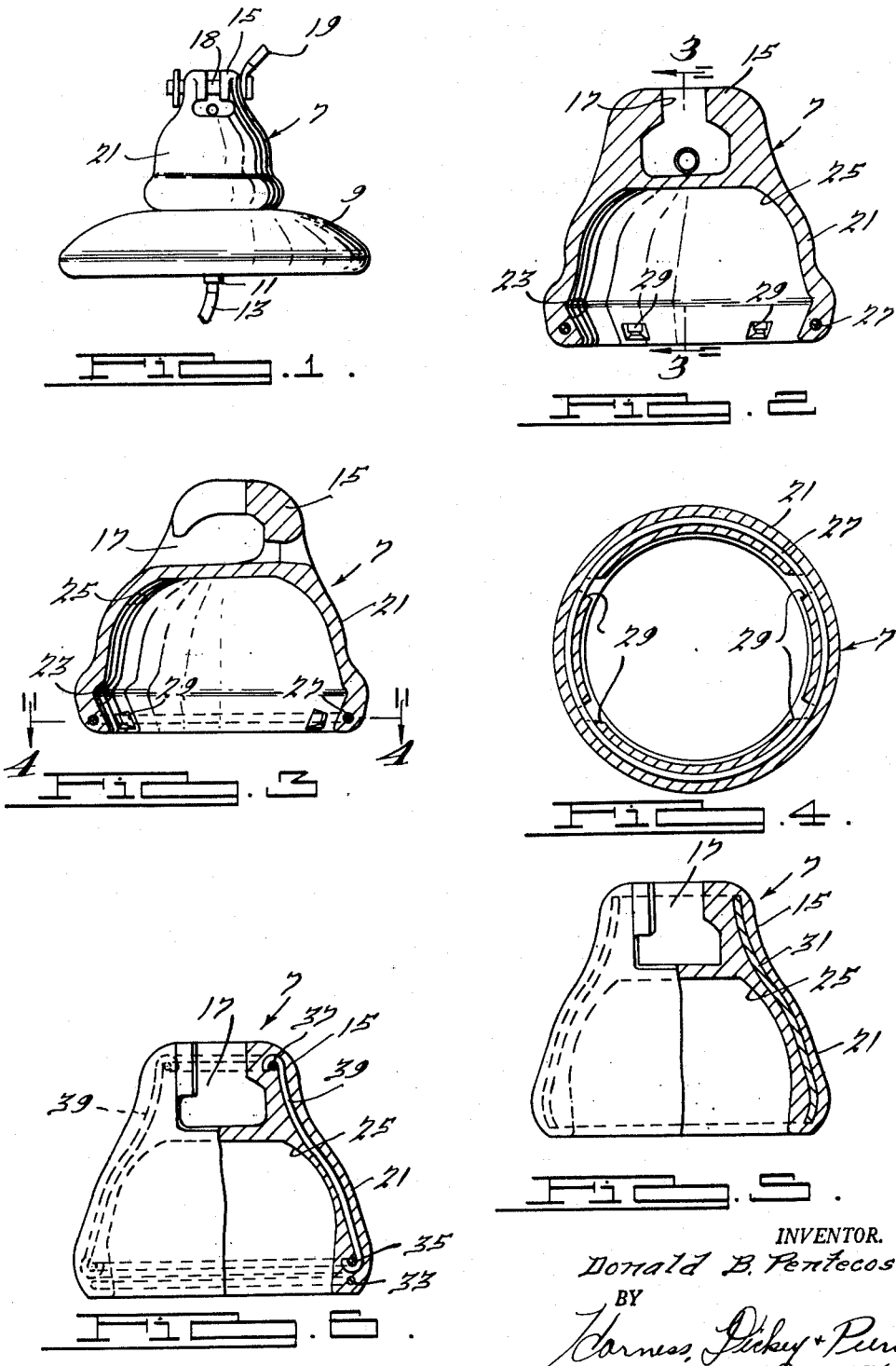

3,011,014
ALUMINUM INSULATOR CAP WITH EMBEDDED REINFORCING MEMBER
Donald B. Pentecost, Detroit, Mich., assignor to Aluminum Industries, Inc., Cincinnati, Ohio, a corporation of Ohio
Filed Sept. 29, 1959, Ser. No. 843,154
1 Claim. (Cl. 174—188)

This invention relates generally to electrical conduit suspension insulators and more particularly to an improved, reinforced, lightweight, nonferrous suspension insulator cap.

In the supporting and suspension of electrical cables and lines, suspension insulators are used in large quantities to properly support such cables on posts or to separate one wire from another, etc. Such suspension insulators normally include a forged steel cap having a porcelain unit cemented or otherwise suitably connected therewith. Several of these suspension insulators may be stacked together to provide a large insulator assembly or units may be used individually, but in any event, the units are subjected to considerable loading due to the fact that the wires or cables which they support may become coated with ice, buffeted by high winds, etc. Also, steel or iron insulator caps must be galvanized, chemically treated and/or painted in order to protect the same from corrosion and deterioration. Such caps are also relatively heavy in weight, relatively expensive to manufacture and expensive to transport or ship.

It is an object of this invention to provide an improved suspension insulator metal cap which is formed of a relatively lightweight, nonferrous material which will have substantial resistance to deterioration and corrosion and which is reinforced so that it will withstand and sustain high loads and stresses equally as well as heretofore known and used heavy steel forgings.

It is a still further object of this invention to provide a lightweight, nonferrous insulator cap of the aforementioned type which is reinforced in an improved and novel manner so that the same will have the desired strength and load-carrying capacity without being heavy in weight.

These and other objects and advantages of the present invention will become apparent from the following detailed description taken in conjunction with the accompanying drawing in which:

FIGURE 1 is a front elevational view of a suspension insulator embodying the cap of this invention;

FIG. 2 is a vertical sectional view of the insulator cap illustrated in FIG. 1;

FIG. 3 is a sectional view of the structure illustrated in FIG. 2, taken along the line 3—3 thereof;

FIG. 4 is a sectional view of the structure illustrated in FIG. 3, taken along the line 4—4 thereof;

FIG. 5 is a view similar to FIG. 2 and 5, illustrating a still further embodiment of the invention.

FIG. 6 is a view similar to FIGS. 2 and 5, illustrating a still further embodiment of the invention.

Referring now to the drawing, and more particularly to FIG. 1, it will be seen that the suspension insulator illustrated includes a lightweight, nonferrous metal cap 7 which is substantially identical in shape and appearance to previously known and used forged steel caps. A porcelain unit 9 is connected with the cap 7 in a conventional manner and the porcelain unit includes a relatively large skirt portion and a smaller head portion cemented within the interior of the cap 7. A pin 11 is cemented into the interior of the porcelain unit and extends therebelow for connection to a ground cable 13. The cap 7 is provided with an upper head or closure portion 15 which is suitably slotted and recessed at 17 to receive a pin 18 to which an electrical cable 19 may be connected. While the appearance and arrangement of the suspension insulator illustrated in FIG. 1 is a conventional, the novelty of this invention resides in the provision and construction of a lightweight, nonferrous cap made preferably of aluminum which is reinforced so as to provide the high load-carrying capacity and strength needed in suspensoin insulator caps without adding materially to the weight of the aluminum.

As can be best seen in FIGS. 2 to 4, the cap 7 is formed of an aluminum casting and has a peripheral wall or skirt portion 21, the lower end of which extends angularly inwardly, as seen in cross-section, to provide an annular shoulder 23 which helps to retain the insulator porcelain unit 9 within the cap when the cap and porcelain are assembled. The peripheral skirt 21 and the upper head or closure portion 15 define a hollow chamber 25 within the cap for receiving a portion of the porcelain unit. The upper head portion 15 of the cap, as previously pointed out, is formed with a recess and slot arrangement 17 for use in interconnecting insulators and/or connecting electrical cables thereto.

By forming the cap from aluminum or other lightweight, nonferrous material, a cap is provided which has excellent resistance to corrosion and deterioration, good conductivity and is extremely light in weight as compared with forged steel. However, when the cap is assembled in a suspension insulator device, the device must be capable of withstanding high loads applied thereto by suspended electrical wires or cables. These loads can be quite high, particularly when it is considered that suspended cables are subjected to high winds, accumulation of ice and other elements. Industry standards may require that suspension insulator caps be capable of withstanding 15,000 pound loads or stresses. In order to provide for this strength and load-carrying capacity, while not materially adding to the weight of the lightweight metal, the cap is reinforced in one of several ways. In the embodiment illustrated in FIGS. 2 to 4, an annular steel wire or hand 27 is embedded in the peripheral skirt portion 21 of the cap adjacent the lower end thereof. This is accomplished in the manufacturing operation by placing the wire 27 in a core for the cap and then casting the aluminum around the wire 27. In this connection, it will be noted that apertures 29 are provided in the wall 21 and these apertures result from the provision of means in the core to hold the wire 27 in place while the cap is cast. After the casting operation, the holding means are retracted, thus leaving the slots or core holes in the cap. The steel hand or wire 27 provides the necessary reinforcing strength to the peripheral wall of the cap to enable the same to withstand a 15,000 pound load or stress. This could not be accomplished without the provision of the reinforcing means.

Certain caps must be even stronger than the cap illustrated in FIGS. 3 to 5, and additional strength can be imparted to the entire cap structure by providing other reinforcing arrangements. For example, in the embodiment illustrated in FIG. 5, a steel shell 31 is embedded in the cap and extends from adjacent the lower end thereof up into the head or closure portion 15. In the manufacture of this cap, the steel shell is held in the core and the aluminum casting poured around the same.

In the embodiment illustrated in FIG. 6, two annular reinforcing bands or wires 33 and 35 are embedded in the cap wall adjacent the lower end thereof and one annular wire or band 37 is embedded in the upper head or closure portion 15 of the cap. The wires 37 and 35 are interconnected by generally vertically extending reinforcing wires 39 which have hook-like ends which extend around the wires 35 and 37 so as to interconnect the same. These reinforcing wires would be held in a core and the aluminum poured around the same, substantially as described previously.

It will thus be appreciated that several reinforcing arrangements may be provided in the aluminum caps to give the desired strength and load-carrying capacity to the same, and it will likewise be appreciated that these reinforcing arrangements do not substantially increase the weight of the caps, but provide a simple and easy means for giving the caps the necessary strength to perform properly while still enabling the provision of a lightweight cap made of nonferrous material which has corrosion and deterioration resistance.

What is claimed is:

A generally bell-shaped insulator cap comprising an annular aluminum skirt having an integral closure portion at one end thereof, a radially outwardly flared intermediate portion, and a radially inwardly flared relatively heavy peripheral portion at the other end thereof, and a continuous annular reinforcing member of generally circular cross section and of material relatively stronger in tension than aluminum substantially imbedded in said skirt at said other end thereof, said reinforcing member being retained in universal stress transmitting relationship by said skirt whereby stress on said skirt portion is transmitted to said reinforcing member irrespective of the vector of the stress.

References Cited in the file of this patent
UNITED STATES PATENTS

| | | |
|---|---|---|
| 1,737,749 | Austin | Dec. 3, 1929 |
| 2,533,064 | Streader | Dec. 5, 1950 |
| 2,716,673 | Culbertson | Aug. 30, 1955 |
| 2,775,747 | Reischer et al. | Dec. 25, 1956 |